United States Patent
Piisila et al.

(10) Patent No.: US 7,801,552 B2
(45) Date of Patent: Sep. 21, 2010

(54) SUPPRESSION OF NEAR-FIELD EFFECTS IN MOBILE HANDSETS

(75) Inventors: Mika Piisila, Kempele (FI); Kent Rosengren, Kalmar (SE)

(73) Assignee: Flextronics AP, LLC, Broomfield, CO (US)

( * ) Notice: Subject to any disclaimer, the term of this patent is extended or adjusted under 35 U.S.C. 154(b) by 688 days.

(21) Appl. No.: 11/743,315

(22) Filed: May 2, 2007
(Under 37 CFR 1.47)

(65) Prior Publication Data

US 2008/0058035 A1 Mar. 6, 2008

Related U.S. Application Data

(60) Provisional application No. 60/746,222, filed on May 2, 2006.

(51) Int. Cl.
*H04M 1/00* (2006.01)
(52) U.S. Cl. ............... 455/550.1; 455/575.1; 455/575.7
(58) Field of Classification Search .................. 455/73, 455/67.13, 63.1, 78, 82, 84, 550.1, 556.1, 455/556.2, 562.1, 569.1, 575.1–575.7; 343/702, 343/767, 850; 381/330, 355
See application file for complete search history.

(56) References Cited

U.S. PATENT DOCUMENTS

| 7,515,944 | B2 * | 4/2009 | Zhu et al. ................ 455/569.1 |
| 2004/0183733 | A1 * | 9/2004 | Aoyama et al. ............ 343/702 |
| 2007/0003088 | A1 * | 1/2007 | Lehtola ..................... 381/330 |

\* cited by examiner

*Primary Examiner*—Kamran Afshar
(74) *Attorney, Agent, or Firm*—Robert G. Crouch; Marsh, Fischmann & Breyfogle LLP

(57) ABSTRACT

Generally, the systems and methods presented herein relate to suppression of certain near field electromagnetic radiation. For example, filtering may be provided to suppress electromagnetic radiation about a speaker module of a mobile handset so as to make the handset more compatible with hearing aids. In one embodiment, a mobile handset includes a speaker module and a power supply. The power supply may provide power and ground to the speaker module via circuit lines coupled between the power supply and the speaker. A filter may be configured with the circuit line used for providing the ground to the speaker module. In this regard, the filter may reduce signal radiation proximate to the speaker module thereby alleviating interference with a user's hearing aid device.

22 Claims, 5 Drawing Sheets

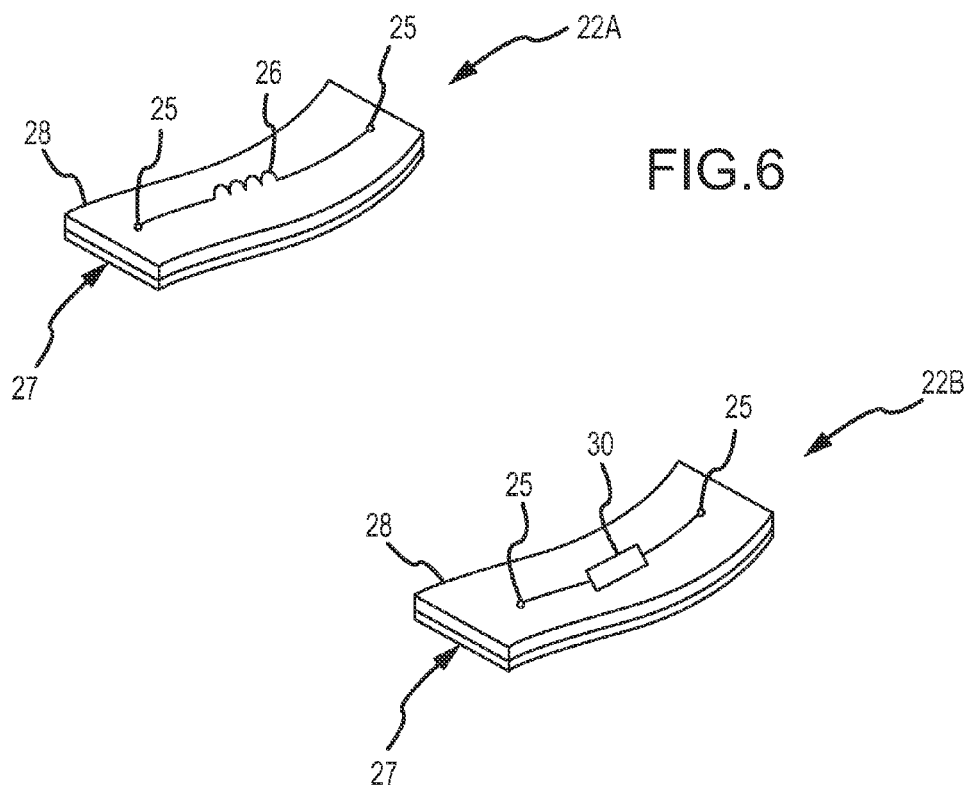
FIG.6
FIG.7
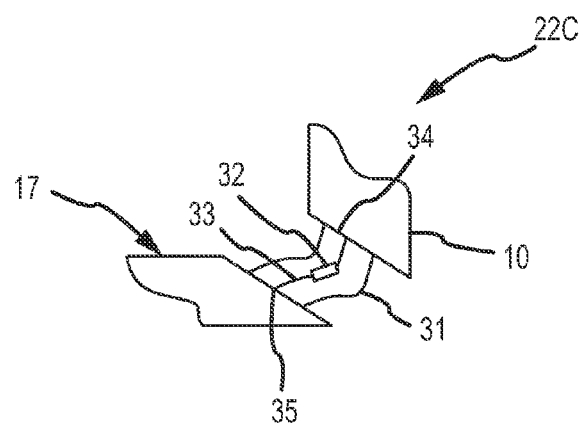
FIG.8

SUPPRESSION OF NEAR-FIELD EFFECTS IN MOBILE HANDSETS

CROSS-REFERENCE RELATED APPLICATIONS

This patent application is related to and claims priority from U.S. Provisional Patent Application No. 60/746,222 (filed May 2, 2006 and entitled "Suppression of Near Field Effects in Mobile Handsets"), the entire contents of which are incorporated within by reference.

BACKGROUND

The American National Standard for Methods of Measurement of Compatibility between Wireless Communication Devices and Hearing Aids (ANSI C63.19-2001) standard describes the requirements of wireless communications with respect to interference and hearing aids. The standard requires that mobile handsets not interfere with hearing aids in order to be deemed hearing aid compatible ("HAC"). The Federal Communications Commission on Jan. 10, 2003 required that manufacturers and service providers make digital wireless phones accessible to hearing-impaired individuals who require hearing aids.

Mobile handsets (e.g., digital wireless phones), in addition to radiating radio frequency energy (RF) from antennas configured therewith, often radiate other forms of energy. For example, a mobile handset is generally configured with a battery that provides electrical energy to circuitry of the handset. This electrical energy results in electric fields (E-fields) and magnetic fields of varying intensities about the mobile handset. More substantially, however, RF currents emanating from the RF module of the handset propagate through conductive parts of the mobile handset (e.g., metal components such as wires) and result in E-fields and magnetic fields that interfere with hearing aids. In a clamshell type mobile handset (i.e., a mobile handset that folds, also known as a flip-phone), E-fields and magnetic fields may be particularly strong near each of the microphone portion and the speaker portion of the handset. These E-fields and magnetic fields often interfere with hearing aids and prevent a hearing-impaired user from improperly communicating via the handset.

SUMMARY

The embodiments shown and described herein generally provide for the suppression of near field radiation caused by E-fields and/or magnetic fields. In one embodiment, a portable communications device includes a microphone unit, a speaker unit, and a power supply that provides power to the speaker unit and to the microphone unit via at least one supply line and at least one ground conductor coupled between the power supply and the speaker unit. The portable communications device also includes a filter configured with the at least one ground conductor, wherein the filter reduces signal radiation proximate to the speaker unit. The filter may be coupled to the at least one ground conductor and configured in a variety of ways, such as an inductor or a ferrite bead filter.

The signal radiation includes electromagnetic radiation. For example, the electromagnetic radiation may be near field RF. In this regard, the filter may be a low pass filter that suppresses the near field RF proximate to the speaker unit. The low pass filter may pass signals at frequencies that are less than about 100 MHz. The ground conductor may be a circuit line configured with a flexible printed circuit board. In this regard, the filter may be configured in series with the circuit line.

The portable communications device may further include an antenna module configured for providing cellular telephony between the portable communications device and a base station. The portable communications device may also include a hearing aid compatibility configuration.

In another embodiment, a system for reducing signal radiation about a portion of a radio communications device includes a power supply that provides a ground reference potential to a plurality of components of the radio communications device and a conductor coupled between the power supply and a first of the plurality of components to provide the ground reference potential to the first component. The system also includes a filter configured with the conductor to reduce signal radiation from a second of the plurality of components to the first component.

In another embodiment, a method of providing hearing aid compatibility to a mobile handset includes providing power to a speaker module of the mobile handset including providing a ground reference potential to the speaker module. The method also includes providing a filter along a conductor that is configured for providing the ground reference potential to the speaker module and filtering signal radiation about the speaker module to reduce interference with a hearing aid. For example, filtering the signal radiation may include low pass filtering the signal radiation at frequencies less than about 100 MHz. In this regard, the signal radiation may include electromagnetic radiation from a transmitter module of the mobile handset.

Providing a filter may include configuring an inductor with the conductor. Alternatively or additionally, providing a filter may include configuring a ferrite bead filter with the conductor. In any case, providing a filter may include configuring the filter with a ground lead of a flexible printed circuit board.

In another embodiment, a system for providing hearing aid compatibility to a mobile handset includes a speaker module and a transceiver module configured for providing cellular communications between the mobile handset and a base station. The system also includes means for processing received cellular communications to provide an audio signal to the speaker module and means for providing power to the speaker module, the transceiver, and the means for processing. The means for providing the power includes means for providing a ground reference potential. The system also includes means for reducing electromagnetic interference about the speaker module to improve hearing aid compatibility with the mobile handset.

The electromagnetic interference may be associated with the transceiver module. The means for reducing the electromagnetic interference about the speaker module may include means for filtering the electromagnetic interference by providing a filter with the means for providing a ground reference potential. The means for providing a ground reference potential may include a circuit line to the speaker module. In this regard, the filter may be an inductor, a ferrite bead, or the like, configured with the circuit line.

The means for filtering may include a means for low pass filtering at frequencies less than about 100 MHz. The means for providing a ground reference potential may be configured with a flexible printed circuit board.

In another embodiment, a system for reducing signal radiation about a portion of an electronics device includes a power supply configured within a first portion of an electronics device, wherein the power supply provides a ground reference potential to a plurality of components of the electronics device. The system includes a conductor coupled between the power supply and a first of the plurality of components to provide the ground reference potential to the first component and a filter configured with the conductor to reduce signal radiation from a second of the plurality of components to the first component.

The electronics device may have at least one folding portion. For example, the electronics device may be a flip phone type of cellular telephone. However, the electronics device may be a bar type cellular telephone.

BRIEF DESCRIPTION OF THE DRAWINGS

Exemplary embodiments are illustrated in referenced figures of the drawings. It is intended that the embodiments and figures disclosed herein be considered illustrative rather than limiting.

FIG. 6 illustrates an embodiment of a filter used in suppressing the near field effects of electromagnetic radiation.

FIG. 7 illustrates another embodiment of a filter used in suppressing the near field effects of electromagnetic radiation.

FIG. 8 illustrates another embodiment of a filter used in suppressing the near field effects of electromagnetic radiation.

DETAILED DESCRIPTION OF THE DRAWINGS

Reference will now be made to the accompanying drawings, which assist in illustrating the various pertinent features of the present invention. Although the present invention will now be described primarily in conjunction with electronics chassis, it should be expressly understood that the present invention may be applicable to other applications where it is desired to achieve an improved grounding connection. In this regard, the following description of an electronics chassis is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
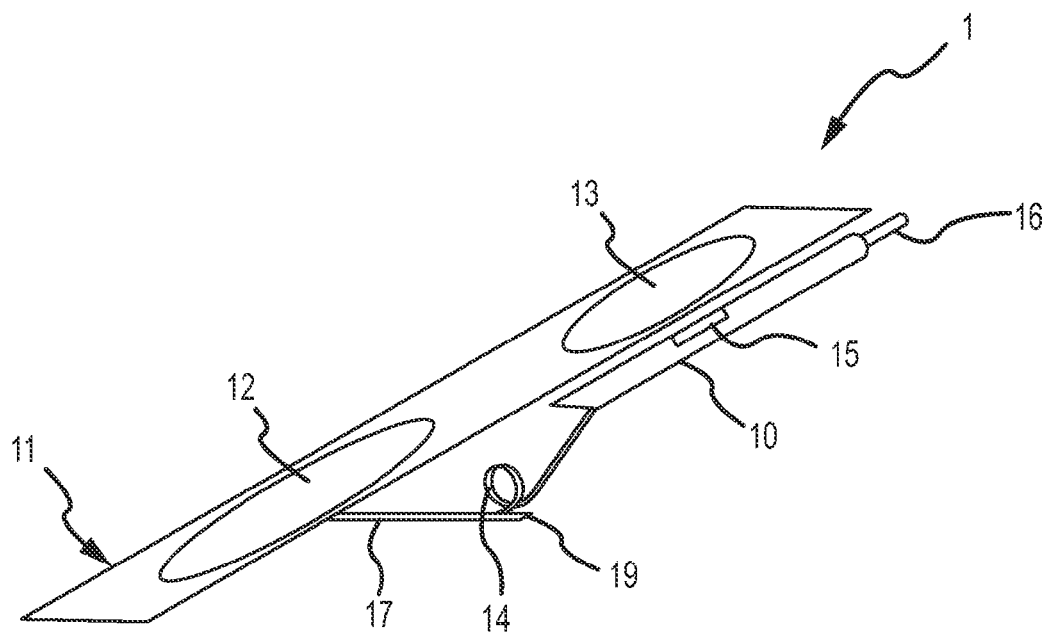
FIG. 1 illustrates a prior art mobile handset and near field electromagnetic radiation.
Figure 2:
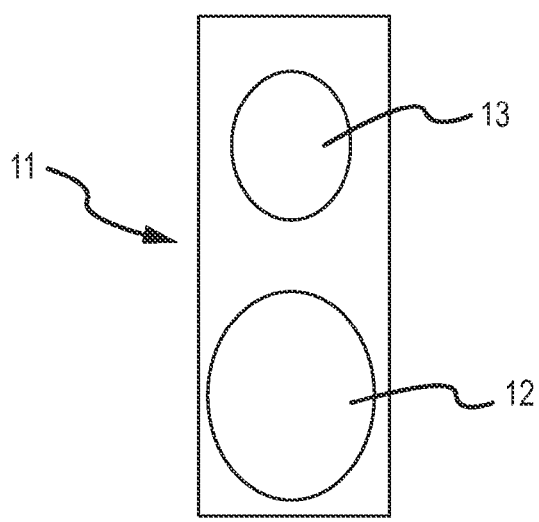
FIG. 2 shows another view of the near field electromagnetic radiation of FIG. 1

FIG. 1 illustrates a prior art mobile handset 1 and near field electromagnetic radiations 12 and 13 (e.g., radiating E-fields and/or magnetic fields). The near field electromagnetic radiations 12 and 13 are illustrated on a plane 11 proximate to the mobile handset 1. In this regard, these so-called "hotspots" 12 and 13 of electromagnetic radiation appear as relatively large circular shapes on the plane 11 to illustrate their magnitudes. FIG. 2 illustrates a frontal view of the plane 11 and the hotspots 12 and 13 to better illustrate their magnitudes.

Generally, the mobile handset 1 is configured as a cellular telephone and, therefore, is configured for radiating and receiving electromagnetic energy for communication purposes. Cellular telephones are configured with power supplies that provide power to various components configured with the telephone, such as transmitter/receiver modules (i.e., a transceiver), display modules, processors, speaker modules, microphone modules, etc.

The mobile handset 1 of this embodiment is configured as a flip phone, or a clamshell type of cellular phone. For example, a clamshell type of phone opens, or unfolds, as two portions (i.e., the speaker portion and the microphone portion), such that the speaker portion is readily accessible to a user's ear and the microphone portion is readily accessible to the user's mouth. Many of phone's components (e.g., the power supply, the microphone unit, the processor, and the transceiver module), are configured within the "microphone portion 17" of the mobile handset 1, in this clamshell type of cellular telephone. Other components, such as the display unit and the speaker module 15, are generally configured with the "speaker portion 10" of the mobile handset 1. Much of the electromagnetic radiation of the cellular telephone is produced by a powered transmitter module of the microphone portion 17 that results in the hot spots 12 and 13 near the microphone and speaker portions 17 and 10, respectively.

Generally, the transmitter module of the mobile handset 1 transfers RF communications to the antenna 16 such that the mobile handset 1 may communicate with base stations of a cellular telephony network. In this clamshell type of cellular telephone, the transmitter module may transfer the RF through the folding portion 19 of the mobile handset 1 to the speaker portion 10 of the mobile handset 1 and ultimately to the antenna 16. For example, the folding portion 19 of the mobile handset 1 may be configured as a flexible printed circuit board that allows for the mobile handset 1 to open and close without damaging electronics components, circuit lines, and/or coaxial cables configured with the printed circuit board. In this regard, the flexible printed circuit board may allow for power, ground, and RF to be transferred from the microphone portion 17 of the mobile handset 1 to the speaker portion 10 of the mobile handset 1. Alternatively, the folding portion 19 may be configured as a "band" of circuit lines and/or coaxial cables that allow for the power, ground, and RF to be transferred from the microphone portion 17 of the mobile handset 1 to the speaker portion 10 of the mobile handset 1.

In either case, the electromagnetic energy provided by the microphone portion 17 of the mobile handset 1 tends to generate a hotspot 12 proximate to the microphone portion. In addition, the current flowing through the ground wires often results in relatively high near field values of electromagnetic energy proximate to the speaker portion 10. This electromagnetic energy generally has little effect on a microphone unit of the mobile handset 1. However, this energy, as it is transferred, through the circuit lines 14 may be problematic elsewhere.

The antenna module 16 of the mobile handset 1 is sometimes configured with the mobile handset at a point that will provide improved transmission and reception capabilities, such as near the top of the mobile phone so that antenna module is not as likely to be covered by a user's hand and/or blocked by the user's head. As such, the transferred electromagnetic energy may generate a similar hotspot 13 in the speaker portion 10 of the mobile handset 1 by the electromagnetic energy being transferred to the antenna module 16. This hotspot 13 may interfere with the speaker module 15 of the mobile handset 1. Alternatively or additionally, the hotspot 13 may interfere with hearing aid devices that a user may be wearing.

Although shown and described with the antenna module 16 being located at the speaker portion 10 of the mobile handset 1, those skilled in the art should readily recognize that the antenna module may be configured in other ways. For example, cell phone antenna modules may be included in the microphone portion 17 of the mobile handset. Additionally, it is not required that the antenna module 16 extend from the mobile handset 1. Rather, antenna modules are commonly configured within mobile handsets and not visible to users.

Figure 3:
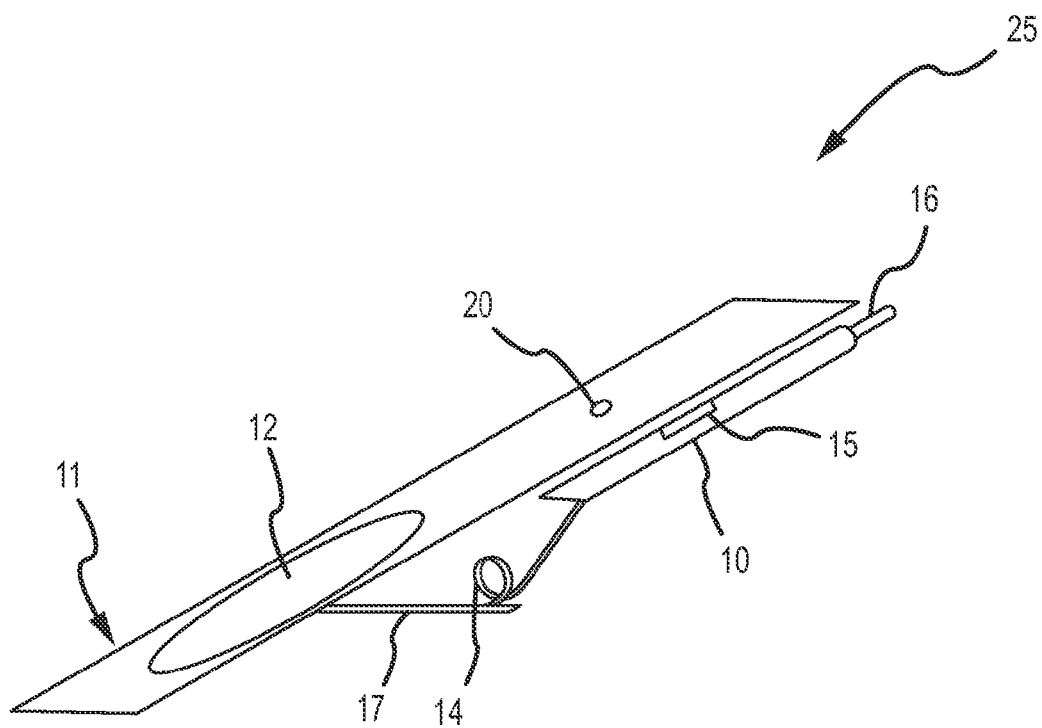
FIG. 3 illustrates a mobile handset and exemplary suppressed near field electromagnetic radiation.
Figure 4:
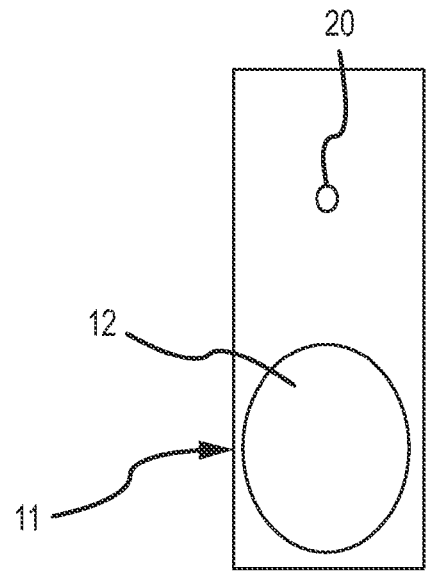
FIG. 4 shows another view of the exemplary suppressed near field electromagnetic radiation of FIG. 3.

FIG. 3 illustrates a mobile handset 25 and exemplary suppressed near field electromagnetic radiation. For example, the mobile handset 25 of this embodiment may be configured to suppress and possibly eliminate hotspots near the mobile handset, particularly near the speaker module 15. In this embodiment, the mobile handset 25 reduces the size of the hotspot 20 near the speaker module 15 in the speaker portion 10 of the mobile handset. FIG. 4 illustrates a frontal view of the plane 11 and the hotspots 12 and 20 to better illustrate their magnitudes. As shown, the hotspot 20 is substantially smaller than the hotspot 13 of the mobile handset 1 of the prior art. This reduced hotspot 20 may reduce the risks associated with the above-mentioned heating as well as improve compatibility with hearing aid devices. The invention, however, is not intended to be limited to clamshell type phones. Rather, the suppression of hotspots, such as hotspot 20, may be performed in "bar" type cellular telephones as well as other types of electronics (e.g., personal digital assistants, personal game players, etc.).

Figure 5:
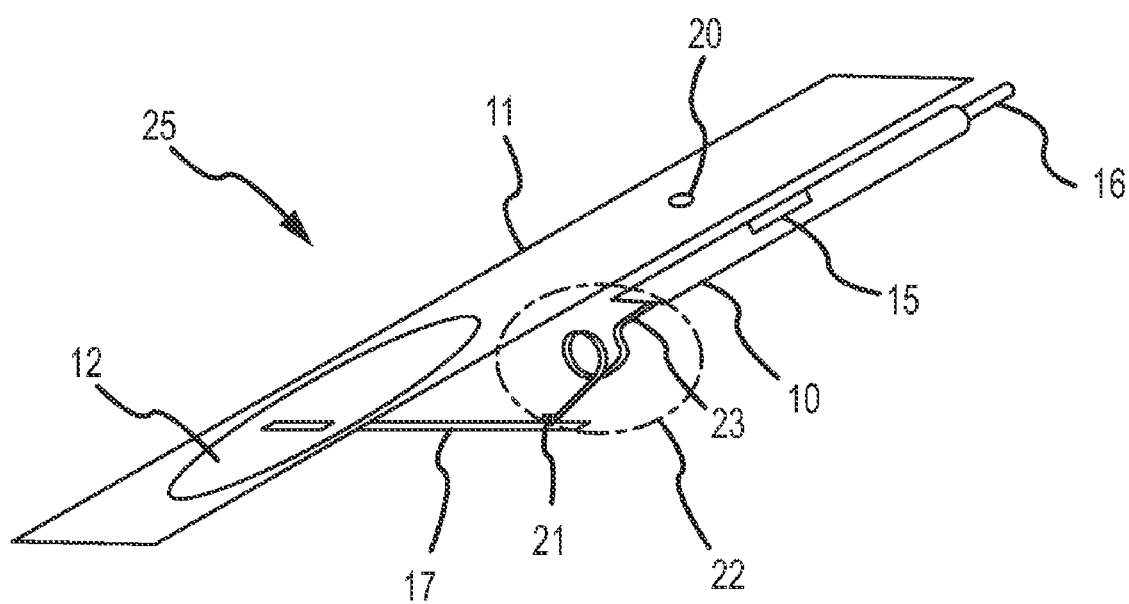
FIG. 5 illustrates a mobile handset with a filter used in suppressing the near field effects of electromagnetic radiation.

FIG. 5 illustrates one embodiment in which the mobile handset 25 may be configured to reduce the hotspot 20 about the speaker module 15 of the mobile handset. In this embodiment, the mobile handset 25 is configured with a filter 21 that is used in suppressing the near field electromagnetic radiation by isolating the ground reference of the microphone portion from the speaker portion at RF frequencies. For example, a power supply module configured within the microphone portion 17 of the mobile handset 25 may provide power and ground to the speaker portion 10 of the mobile handset to supply various components configured therewith, such as a display module and the speaker module 15, as mentioned above. The power and ground, as well as the RF from a transceiver module configured with the microphone portion 17, may be provided to the speaker portion 10 by a flexible means 23, such as a flexible printed circuit board or a flexible band of cables configured between the microphone portion 17 and the speaker portion 10. These signals generally cause current to flow through the ground wires which often results in high near field values near the speaker portion. To alleviate such problems, the filter 21 may be configured within the folding portion 22 of the mobile handset 25 (e.g., in series with a circuit line that provides a ground reference potential to the speaker portion 10 of the mobile handset 25). In this regard, the filter 21 may be configured to attenuate RF signals propagating along the ground lines while passing other necessary signals to the speaker portion 10. Accordingly, the hotspot 20 may be resultantly smaller than the hotspot 13 associated with the mobile handset 1 of FIG. 1. In one embodiment, the filter 21 is configured as a low pass filter that passes frequencies less than about 100 MHz, a range that is generally lower than the RF required for cellular telephony.

The filter 21 may be configured in a variety of manners. FIGS. 6, 7, and 8 illustrate various embodiments for the filter 21 configurations. For example, FIG. 6 illustrates an inductor 26 configured with a flexible printed circuit board 28 which forms the folding portion 22A as it may be used in the mobile handset 25 of FIG. 5. In this embodiment, the flexible printed circuit board 28 is configured with a ground plane 27 to which the inductor 26 may couple by means of circuit board vias 25. Those skilled in the art are readily familiar with configuring circuit boards with interfaces such that the flexible printed circuit board 28 may interface with the various electronics components associated with the microphone portion 17 and the speaker portion 10 of the mobile handset 25.

Additionally, those skilled in the art should readily recognize that the filter 21 may be configured with other components to provide similar results. For example, the low pass filter may be configured, based on filter performance considerations (e.g., filter shape), from a variety of passive and/or active components. In one embodiment, the inductor has an approximate value of 0.08 µH. In another embodiment, the filter 21 is configured as a ferrite bead electromagnetic interference (EMI) filter. For example, FIG. 7 illustrates the flexible portion 22B configured with a ferrite bead filter 30 coupled to the ground plane 27 by the circuit board vias 25. Ferrite bead filters are commonly used in RF signal conditioning. In this regard, the ferrite bead filter 30 may be suitably configured to attenuate RF signals with the ground lines as described hereinabove. However, the invention is not intended to be limited to ferrite bead filters as other materials may also prove suitable for the RF attenuation characteristics described herein.

FIG. 8 illustrates another embodiment of the flexible portion 22C. In this embodiment, the flexible portion 22C is configured as a band of cables 31, such as a ribbon cable, to provide connections between the microphone portion 17 and the speaker portion 10 of the mobile handset 25. In this regard, a filter 32 may be configured with the band of cables 31 along the ground line 33 between the microphone portion 17 and the speaker portion 10. That is, the ground line 33 may provide a ground reference potential from power supply module configured with the microphone portion 17 to the speaker portion 10. The filter 32 may be configured to suppress the RF signaling as described herein to substantially reduce the size of the hotspot 20.

Figure 9:
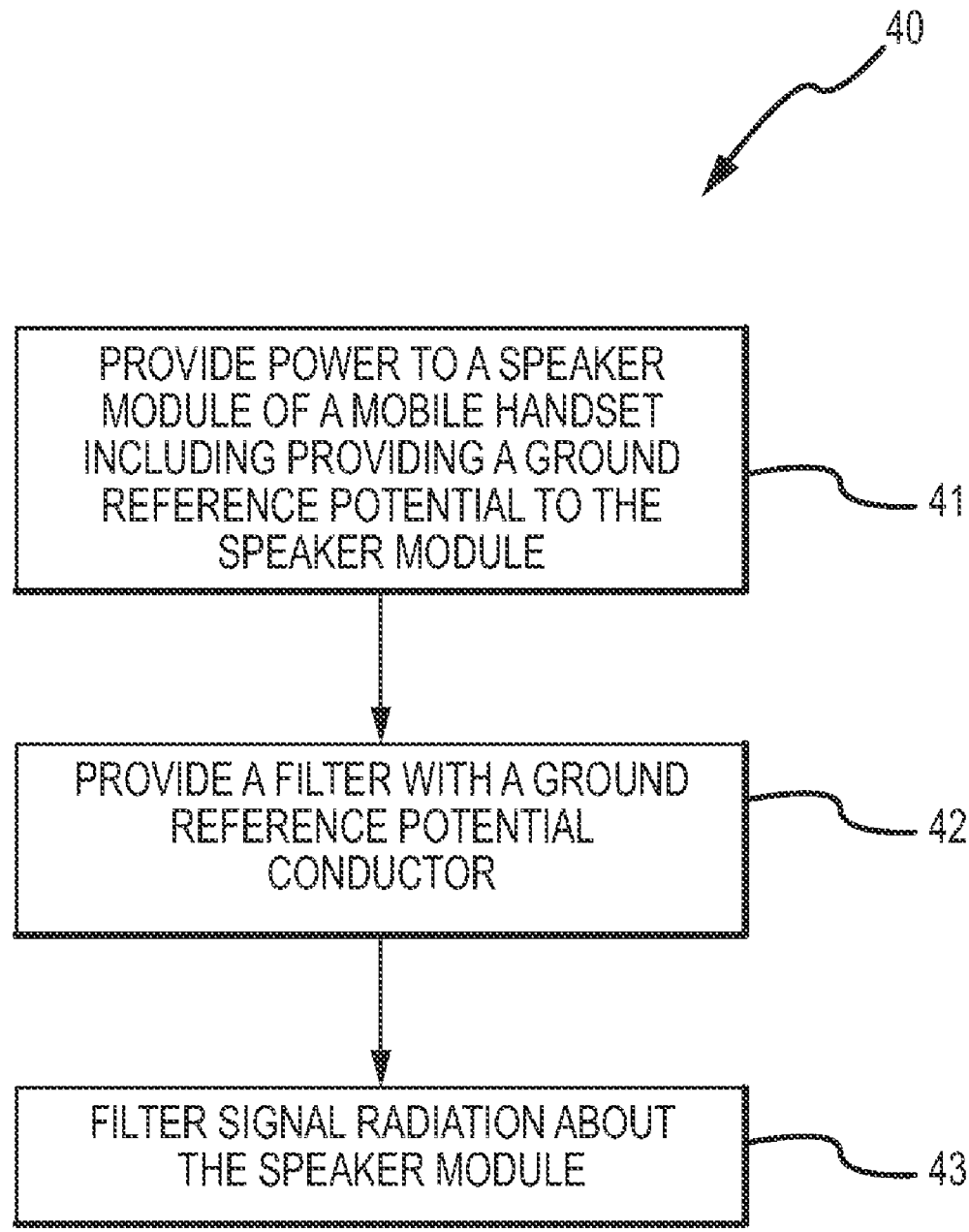
FIG. 9 illustrates a flowchart of a process for suppressing the near field effects of electromagnetic radiation.

FIG. 9 illustrates a flowchart of a process 40 used in suppressing the near field electromagnetic radiation. For example, a power supply module may be configured with a mobile handset so as to provide power to various components of the mobile handset. The power supply module may be configured within the microphone portion of a clamshell type phone. The power supply module may transfer power and ground to the speaker portion of the phone as described hereinabove, in the process element 41. A filter may be provided with one or more of the circuit lines that are configured for providing the ground to the speaker portion, in the process element 42. For example, a filter may be configured in series with a ground conductor between the microphone portion and the speaker portion of the mobile handset. In this regard, the filter may suppress electromagnetic radiation about the speaker module, in the process element 43.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

The invention claimed is:

1. A portable communications device, including:
   a transmitter that generates an RF signal;
   an antenna receptive of the RF signal from the transmitter, the antenna radiating RF energy based on the RF signal from the transmitter;
   a microphone unit;
   a speaker unit;
   a power supply that provides power to the speaker unit and to the microphone unit via at least one supply line and at least one ground conductor coupled between the power supply and the speaker unit; and
   a filter in series with the at least one ground conductor, wherein the filter reduces signal radiation by the speaker unit by reducing the coupling of the RF signals to the speaker unit.

2. The portable communications device of claim 1, wherein the antenna is configured for providing cellular telephony between the portable communications device and a base station.

3. The portable communications device of claim 1, further including a hearing aid compatibility configuration.

4. The portable communications device of claim 1, wherein the filter is an inductor in series with the at least one ground conductor.

5. The portable communications device of claim 1, wherein the filter is a ferrite bead filter coupled to the at least one ground conductor.

6. The portable communications device of claim 1, wherein the signal radiation includes electromagnetic radiation.

7. The portable communications device of claim 6, wherein the electromagnetic radiation includes near field RF and wherein the filter is a low pass filter that suppresses the near field RF proximate to the speaker unit.

8. The portable communications device of claim 7, wherein the low pass filter passes signals at frequencies that are less than 100 MHz.

9. The portable communications device of claim 1, wherein the ground conductor is a circuit line configured with a flexible printed circuit board and wherein the filter is configured in series with the circuit line.

10. A system for reducing signal radiation about a portion of a radio communications device, including:
    a transmitter that generates an RF signal;
    an antenna receptive of the RF signal from the transmitter, the antenna radiating RF energy based on the RF signal from the transmitter;
    a power supply that provides a ground reference potential to a plurality of other components of the radio communications device;
    a first conductor coupled between the power supply and a first of the plurality of other components to provide the ground reference potential to the first component;
    a second conductor coupled between the power supply and a second of the plurality of other components to provide the ground reference potential to the second component; and
    a filter in series with the second conductor to reduce signal radiation by the second of the plurality of components to the first component by reducing the coupling of the RF signals to the second component.

11. A method of providing hearing aid compatibility to a mobile handset, including:
    providing RF signals from a transmitter to an antenna;
    providing power to a speaker module of the mobile handset, wherein providing said power includes providing a ground reference potential to the speaker module;
    providing a filter in series with a conductor that is configured for providing the ground reference potential to the speaker module; and
    filtering signal RF signals within the speaker module to reduce radiation of RF signals about the speaker module to reduce interference with a hearing aid.

12. The portable communications device of claim 7, wherein the low pass filter passes signals at frequencies that are less than 100 MHz.

13. The method of claim 11, wherein providing a filter includes configuring an inductor with the conductor.

14. The method of claim 11, wherein providing a filter includes configuring a ferrite bead filter with the conductor.

15. The method of claim 11, wherein providing a filter includes configuring the filter with a ground lead of a flexible printed circuit board.

16. A system for providing hearing aid compatibility to a mobile handset, including:
    a speaker module;
    a transceiver module configured for providing cellular communications between the mobile handset and a base station;
    means for processing received cellular communications to provide an audio signal to the speaker module;
    means for providing power to the speaker module, the transceiver, and the means for processing, wherein the means for providing said power includes means for providing a ground reference potential; and
    means for reducing coupling of RF signals to the speaker module to reduce electromagnetic radiation by the speaker module to improve hearing aid compatibility with the mobile handset.

17. The system of claim 16, wherein the coupling of RF signal is associated with the transceiver module.

18. The system of claim 16, wherein the means for reducing the coupling and electromagnetic radiation by the speaker module includes means for filtering the electromagnetic interference by providing a filter in series with the means for providing a ground reference potential.

19. The system of claim 18, wherein the means for providing a ground reference potential includes a circuit line to the speaker module and wherein the filter is an inductor configured with the circuit line.

20. The system of claim 18, wherein the means for providing a ground reference potential includes a circuit line to the speaker module and wherein the filter is a ferrite bead filter configured with the circuit line.

21. The system of claim 18, wherein the means for filtering includes a means for low pass filtering at frequencies less than about 100 MHz.

22. The system of claim 16, wherein the means for providing a ground reference potential is configured with a flexible printed circuit board.

* * * * *